United States Patent
Jaffrennou et al.

(10) Patent No.: US 9,051,494 B2
(45) Date of Patent: Jun. 9, 2015

(54) SIZING COMPOSITION FOR MINERAL WOOL HAVING A LOW EMISSION OF VOLATILE ORGANIC COMPOUNDS, AND INSULATING PRODUCTS OBTAINED

(75) Inventors: Boris Jaffrennou, Paris (FR); Benjamin Kaplan, Paris (FR); Vincent Gignoux, Chamant (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 610 days.

(21) Appl. No.: 13/252,654

(22) Filed: Oct. 4, 2011

(65) Prior Publication Data
US 2012/0319029 A1 Dec. 20, 2012

(30) Foreign Application Priority Data
Jun. 17, 2011 (FR) ...................................... 11 55313

(51) Int. Cl.
| | | |
|---|---|---|
| C08K 13/02 | (2006.01) | |
| C08K 5/54 | (2006.01) | |
| C09J 103/02 | (2006.01) | |
| C03C 25/32 | (2006.01) | |
| C08K 5/1545 | (2006.01) | |
| C08K 5/5455 | (2006.01) | |
| C08K 3/32 | (2006.01) | |
| D04H 1/4218 | (2012.01) | |
| D04H 1/4209 | (2012.01) | |
| D04H 1/587 | (2012.01) | |
| D04H 3/002 | (2012.01) | |
| D04H 3/004 | (2012.01) | |
| D04H 3/12 | (2006.01) | |
| C08L 3/02 | (2006.01) | |
| C08K 3/30 | (2006.01) | |
| C08K 5/092 | (2006.01) | |
| C08K 5/42 | (2006.01) | |
| C08K 5/43 | (2006.01) | |
| C08L 33/02 | (2006.01) | |
| C08K 5/151 | (2006.01) | |
| C08L 5/00 | (2006.01) | |

(52) U.S. Cl.
CPC ............. *C09J 103/02* (2013.01); *C03C 25/321* (2013.01); *C08K 5/1545* (2013.01); *C08K 13/02* (2013.01); *C08K 5/5455* (2013.01); *C08K 3/32* (2013.01); *C03C 25/32* (2013.01); *C08K 3/30* (2013.01); *C08K 5/092* (2013.01); *C08K 5/42* (2013.01); *C08K 5/43* (2013.01); *C08L 33/02* (2013.01); *D04H 1/4218* (2013.01); *D04H 1/4209* (2013.01); *D04H 1/587* (2013.01); *D04H 3/002* (2013.01); *D04H 3/004* (2013.01); *D04H 3/12* (2013.01); *C08K 5/151* (2013.01); *C08L 5/00* (2013.01); *C08L 3/02* (2013.01)

(58) Field of Classification Search
CPC ......... C09J 103/02; C08K 3/32; C08K 5/092; C08K 5/43; C08K 5/1545; C08K 13/02; C08K 5/5455; D04H 1/4218; D04H 1/4209; D04H 1/587; D04H 3/002; D04H 3/004; D04H 3/12; C08L 5/00; C08L 5/02; C03C 25/32; C03C 25/321
See application file for complete search history.

(56) References Cited

U.S. PATENT DOCUMENTS

| | | |
|---|---|---|
| 5,318,990 A | 6/1994 | Strauss |
| 5,340,868 A | 8/1994 | Strauss et al. |
| 5,661,213 A | 8/1997 | Arkens et al. |
| 5,895,804 A | 4/1999 | Lee et al. |
| 5,932,689 A | 8/1999 | Arkens et al. |
| 5,977,232 A | 11/1999 | Arkens et al. |
| 6,071,994 A | 6/2000 | Hummerich et al. |
| 6,099,773 A | 8/2000 | Reck et al. |
| 6,146,746 A | 11/2000 | Reck et al. |
| 6,299,936 B1 | 10/2001 | Reck et al. |
| 6,331,350 B1 | 12/2001 | Taylor et al. |
| 7,893,154 B2 * | 2/2011 | Van Herwijnen et al. ... 525/54.3 |
| 8,864,893 B2 * | 10/2014 | Hawkins et al. .......... 106/215.5 |
| 2002/0091185 A1 | 7/2002 | Taylor et al. |
| 2002/0188055 A1 | 12/2002 | Chen et al. |
| 2003/0008978 A1 | 1/2003 | Chen et al. |
| 2004/0002567 A1 | 1/2004 | Chen et al. |
| 2005/0215153 A1 | 9/2005 | Cossement et al. |
| 2010/0282996 A1 * | 11/2010 | Jaffrennou et al. .......... 252/8.83 |
| 2011/0039111 A1 * | 2/2011 | Shooshtari .................... 428/426 |
| 2011/0223364 A1 * | 9/2011 | Hawkins et al. ............. 428/34.5 |
| 2013/0331489 A1 * | 12/2013 | Kreh ............................. 524/100 |
| 2014/0083328 A1 * | 3/2014 | Lochel et al. .............. 106/162.8 |

FOREIGN PATENT DOCUMENTS

| | | |
|---|---|---|
| WO | 2007/014236 | 2/2007 |
| WO | 2009/019232 | 2/2009 |
| WO | 2009/019235 | 2/2009 |
| WO | 2009/080938 | 7/2009 |
| WO | 2011/045531 | 4/2011 |

* cited by examiner

*Primary Examiner* — David M Brunsman
(74) *Attorney, Agent, or Firm* — Pillsbury Winthrop Shaw Pittman LLP

(57) ABSTRACT

A sizing composition for insulating products based on mineral wool, in particular of glass or of rock, includes at least one saccharide, at least one organic polycarboxylic acid, at least one esterification catalyst, and at least one agent capable of reducing the emissions of volatile organic compounds (VOCs) chosen from sulphates, sulphamates and carbonates.

25 Claims, No Drawings

SIZING COMPOSITION FOR MINERAL WOOL HAVING A LOW EMISSION OF VOLATILE ORGANIC COMPOUNDS, AND INSULATING PRODUCTS OBTAINED

CROSS-REFERENCE TO RELATED APPLICATIONS

This application claims the benefit of priority from French patent application No. 11/55313, filed on Jun. 17, 2011, the entire content of which is incorporated herein by reference.

FIELD

The present invention relates to the field of thermal and/or acoustic insulating products based on mineral wool, in particular of glass or of rock, and on a formaldehyde-free organic binder.

The invention more particularly relates to a sizing composition capable of crosslinking to form the organic binder, which includes at least one saccharide, at least one organic polycarboxylic acid and at least one esterification catalyst and additionally comprises an agent which makes it possible to reduce the amount of volatile compounds emitted by the insulating product.

BACKGROUND

The manufacture of insulating products based on mineral wool generally comprises a stage of manufacture of the wool itself, which can be carried out by various processes, for example according to the known technique of fiberizing by external or internal centrifugation. Internal centrifugation consists in introducing the molten mineral material (glass or rock) into a centrifugal device comprising a multitude of small orifices, the material being projected toward the peripheral wall of the device under the action of the centrifugal force and escaping therefrom in the form of filaments. On leaving the centrifugal device, the filaments are drawn and carried towards a receiving member by a gas stream having a high temperature and a high speed, in order to form there a web of fibres (or mineral wool).

In order to provide for the assembly of the fibres together and to make it possible for the web to have cohesion, a sizing composition comprising a thermosetting resin is projected onto the fibres, on the route between the outlet of the centrifugal device and the receiving member. The web of fibres coated with the size is subjected to a heat treatment, at a temperature generally of greater than 100° C., in order to bring about the polycondensation of the resin and to thus obtain a thermal and/or acoustic insulating product having specific properties, in particular dimensional stability, tensile strength, thickness recovery after compression and homogeneous colour.

The sizing composition to be projected onto the mineral wool is generally provided in the form of an aqueous solution including the thermosetting resin and additives, such as a catalyst for the crosslinking of the resin, an adhesion-promoting silane, a dust-preventing mineral oil, and the like. The sizing composition is generally applied to the fibres by spraying.

The properties of the sizing composition depend largely on the characteristics of the resin. From the viewpoint of the application, it is necessary for the sizing composition to exhibit good sprayability and to be able to be deposited at the surface of the fibres in order to efficiently bind them.

The resin has to be stable for a given period of time before being used to form the sizing composition, which composition is generally prepared at the time of use by mixing the resin and the additives mentioned above.

At the regulatory level, it is necessary for the resin to be regarded as non-polluting, that is to say for it to comprise—and for it to generate during the sizing stage or subsequently—as little as possible in the way of compounds which may be harmful to human health or to the environment.

The thermosetting resins most commonly used are phenolic resins belonging to the family of the resols. In addition to their good crosslinkability under the abovementioned thermal conditions, these resins are soluble in water, have a good affinity for mineral fibres, in particular glass fibres, and are relatively inexpensive.

Resols are generally obtained by reaction of a phenol and an aldehyde under basic conditions, a proportion of these compounds which have not reacted occurring in the final resin. The most widely used aldehyde is formaldehyde, the presence of which in the form of free formaldehyde is undesirable because of its known harmful effects.

Regulations with regard to environmental protection, which are becoming more restrictive, are forcing manufacturers of insulating products to look for solutions which make it possible to further lower the levels of undesirable emissions, in particular of formaldehyde, whether with regard to the manufacture of the insulating products or the use thereof.

Solutions in which resols are replaced in sizing compositions are known and are based on the use of a carboxylic acid polymer, in particular an acrylic acid polymer, and of a hydroxylated compound.

In U.S. Pat. No. 5,340,868, the size comprises a polycarboxylic polymer, a β-hydroxyamide and an at least trifunctional monomeric carboxylic acid.

Sizing compositions are also known which comprise a polycarboxylic polymer, a polyol and a catalyst, which catalyst is a catalyst comprising phosphorus (U.S. Pat. No. 5,318,990, U.S. Pat. No. 5,661,213, U.S. Pat. No. 6,331,350, US 2003/0008978), a fluoroborate (U.S. Pat. No. 5,977,232) or else a cyanamide, a dicyanamide or a cyanoguanidine (U.S. Pat. No. 5,932,689).

Sizing compositions are also known which comprise an alkanolamine including at least two hydroxyl groups and a polycarboxylic polymer (U.S. Pat. No. 6,071,994, U.S. Pat. No. 6,099,773, U.S. Pat. No. 6,146,746, US 2002/0091185) in combination with a copolymer (U.S. Pat. No. 6,299,936).

The sizing compositions based on a polycarboxylic polymer and on a polyol can additionally include a cationic, amphoteric or nonionic surfactant (US 2002/0188055) or a coupling agent of silane type (US 2004/0002567).

The proposal has also been made to replace all or part of the hydroxylated compound by a saccharide.

A description is given, in US 2005/0215153, of a size formed from a prebinder comprising polymer of carboxylic acid and of a polyol, and from a dextrin as cobinder.

Furthermore, an adhesive composition based on heat-crosslinkable polysaccharides is known which can be used as size for mineral wool (U.S. Pat. No. 5,895,804). The composition comprises a polycarboxylic polymer having at least two carboxylic acid functional groups and a molecular weight of at least equal to 1000, and a polysaccharide having a molecular weight of at least equal to 10 000.

A formaldehyde-free aqueous sizing composition is also known which comprises a Maillard reaction product, in particular combining a reducing sugar, a carboxylic acid and aqueous ammonia (WO 2007/014236). In WO 2009/019232 and WO 2009/019235, the proposal is made to replace the carboxylic acid with an acid precursor derived from an inorganic salt, in particular an ammonium salt, which exhibits the additional advantage of being able to replace all or part of the aqueous ammonia.

In WO 2009/080938, the sizing composition for mineral wool comprises a monosaccharide and/or a polysaccharide and an organic polycarboxylic acid with a molar mass of less than 1000, optionally in combination with a catalyst which makes it possible to adjust the crosslinking start temperature.

Furthermore, provision is made, in WO 2011/045531, for a sizing composition for mineral wool based on a reducing sugar and on an inorganic acid metal salt chosen from inorganic acid alkali metal, alkaline earth metal, transition metal or poor metal salts.

SUMMARY

An aspect of embodiments of the present invention is to provide a sizing composition for insulating products based on mineral wool which is devoid of formaldehyde and which makes it possible to reduce the amount of volatile organic products (VOCs) emitted by the insulating product.

According to an embodiment of the invention, there is provided a sizing composition for insulating products based on mineral wool, in particular of glass or of rock, which comprises
  at least one saccharide,
  at least one organic polycarboxylic acid,
  at least one esterification catalyst, and
  at least one agent capable of reducing the emissions of volatile organic compounds (VOCs) chosen from sulphates, sulphamates and carbonates.

DETAILED DESCRIPTION

The term "saccharide" is understood to mean any type of saccharide comprising at least one reducing or nonreducing saccharide unit, including hydrogenated saccharides.

The saccharide can be a monosaccharide or a polysaccharide.

The monosaccharide is chosen from monosaccharides including from 3 to 8 carbon atoms, preferably, in an embodiment, aldoses and advantageously aldoses comprising from 5 to 7 carbon atoms. The aldoses which are particularly preferred are natural aldoses (belonging to the D series), in particular hexoses.

Mention may be made, as example of monosaccharide, of glucose, sorbitol, mannose, mannitol and galactose.

Mention may be made, as examples of polysaccharides, of disaccharides, such as maltose, maltitol, isomaltose, isomaltitol, lactose, lactitol, cellobiose, cellobitol, trehalose, isotrehaloses, sucrose, isosucroses and gentobiose; trisaccharides, such as maltotriose, maltotritol, maltotriulose, raffinose, melezitose, gentianose, erlose and umbelliferose; tetrasaccharides such as stachyose; pentasaccharides, such as verbascose; dextrins and their hydrogenation products; molasses and starches.

Dextrins are compounds corresponding to the general formula $(C_6H_{10}O_5)_n$ obtained by partial hydrolysis of starch. The processes for the preparation of dextrins are known. For example, dextrins can be prepared by heating or by drying to dryness a starch, generally in the presence of an acid catalyst, which results in the constituent amylose and amylopectin molecules of the said starch being ruptured to give products of lower molar mass. Dextrins can also be obtained by treating the starch enzymatically with one or more amylases, in particular microbial amylases, capable of hydrolyzing the bonds of the starch. The nature of the treatment (chemical or enzymatic) and the hydrolysis conditions have a direct effect on the average molar mass and the distribution of the molar masses of the dextrin.

The dextrins in accordance with an embodiment of the invention can be obtained from starch or starch derivatives of varied plant origin, for example resulting from tubers, such as potato, cassava, maranta and sweet potato, resulting from seeds, such as wheat, maize, rye, rice, barley, millet, oats and sorghum, resulting from fruit, such as horse chestnut, sweet chestnut and hazelnut, or resulting from leguminous plants, such as peas and beans.

In an embodiment, preference is given in particular to the dextrins having a dextrose equivalent (DE) of greater than or equal to 5, preferably of greater than or equal to 10 and advantageously of greater than or equal to 15.

Conventionally, the dextrose equivalent DE is defined by the following relationship:

$$DE = 100 \times \left( \frac{\text{number of glycoside bonds cleaved}}{\text{number of glycoside bonds in the starting starch}} \right)$$

The products of hydrogenation of the dextrins can be obtained by any known method operating under conditions of high hydrogen pressure and high temperature, in the presence of a catalyst chosen from Groups Ib, IIb, IVb, VI, VII and VIII of the Periodic Table of the Elements, preferably from nickel, platinum, palladium, cobalt, molybdenum and their mixtures. The preferred catalyst is Raney nickel.

Molasses are residues from the refining of sugar extracted in particular from cane and beet which comprise a high content of glucides, of the order of 40 to 60% by weight. Sucrose constitutes the bulk of the glucides of molasses.

The molasses in accordance with an embodiment of the invention preferably include from 45 to 50% by weight of total glucides, expressed as sucrose.

Beet molasses are particularly preferred in an embodiment.

Preferably, in an embodiment, the polysaccharide includes at least one unit chosen from the abovementioned aldoses, advantageously glucose. Particular preference is given to the polysaccharides which are predominantly (to more than 50% by weight) composed of glucose units.

In an embodiment, preference is given to glucose, dextrins and molasses, advantageously glucose and dextrins.

The term "organic polycarboxylic acid" is understood to mean an organic acid comprising at least two carboxyl functional groups, preferably at most 50 carboxyl functional groups, advantageously at most 30 carboxyl functional groups and better still at most 20 carboxyl functional groups.

The organic polycarboxylic acid acts as crosslinking agent; it is capable of reacting with the saccharide under the effect of heat to form ester bonds, resulting in a polymeric network being obtained in the final binder. The polymeric network makes it possible to establish bonds at the junctions of the fibres in the mineral wool.

The organic polycarboxylic acid can be provided in the form of a monomer or of a polymer.

The organic polycarboxylic acid can be a dicarboxylic acid, for example oxalic acid, malonic acid, succinic acid, glutaric acid, adipic acid, pimelic acid, suberic acid, azelaic acid, sebacic acid, malic acid, tartaric acid, tartronic acid, aspartic acid, glutamic acid, fumaric acid, itaconic acid, maleic acid, traumatic acid, camphoric acid, phthalic acid and its derivatives, in particular comprising at least one boron or chlorine atom, tetrahydrophthalic acid and its derivatives, in particular comprising at least one chlorine atom, such as chlorendic acid, isophthalic acid, terephthalic acid, mesaconic acid and citraconic acid, or a dicarboxylic acid precursor, in particular an anhydride, such as maleic anhydride, succinic anhydride and phthalic anhydride; a tricarboxylic acid, for example citric acid, tricarballylic acid, 1,2,4-butanetricarboxylic acid, aconitic acid, hemimellitic acid, trimellitic acid and trimesic acid; a tetracarboxylic acid, for example 1,2,3,4-butanetetracarboxylic acid and pyromellitic acid; or an unsaturated acid polymer, for example a homopolymer of acrylic or methacrylic acid or a copolymer of acrylic or methacrylic acid and of one or more unsaturated monomers.

In an embodiment, preference is given to citric acid, 1,2,3,4-butanetetracarboxylic acid, succinic acid, tartaric acid, glutamic acid, itaconic acid, maleic acid, citraconic acid, maleic anhydride, succinic anhydride and (meth)acrylic acid polymers.

In an embodiment, the organic polycarboxylic acid which is particularly preferred is citric acid, 1,2,3,4-butanetetracarboxylic acid and (meth)acrylic acid polymers.

In the sizing composition of an embodiment, the saccharide represents from 5 to 90% of the weight of the mixture composed of the saccharide and the organic polycarboxylic acid, preferably from 20 to 85% and advantageously from 30 to 80%.

The role of the esterification catalyst is, as indicated above, to increase the rate of the esterification reaction between the saccharide and the organic polycarboxylic acid.

The esterification catalyst is chosen from the group consisting of Lewis bases and acids, such as clays or colloidal or noncolloidal silica; organic amines; quaternary amines; catalysts based on silicates; metal oxides; metal chlorides or urea chlorides; metal nitrates or ammonium nitrates; phosphorus-based compounds, such as metal phosphates or ammonium phosphates, in particular ammonium phosphate, monoammonium phosphate or diammonium phosphate, a phosphoric acid or an alkylphosphonic acid; and compounds comprising fluorine and boron, for example tetrafluoroboric acid or a salt of this acid, in particular an alkali metal tetrafluoroborate, such as sodium tetrafluoroborate or potassium tetrafluoroborate, an alkaline earth metal tetrafluoroborate, such as calcium tetrafluoroborate or magnesium tetrafluoroborate, a zinc tetrafluoroborate and an ammonium tetrafluoroborate.

In an embodiment, preference is given to sodium phosphite, potassium phosphite, sodium hypophosphite or potassium hypophosphite and very particularly to sodium phosphite, sodium hypophosphite and the mixtures of these compounds.

In an embodiment, the amount of esterification catalyst in the sizing composition generally represents from 1 to 20% of the weight of the saccharide and organic polycarboxylic acid, preferably from 2 to 15% and advantageously from 2.5 to 10%.

The agent capable of reducing the VOC emissions is, as indicated above, chosen from sulphates, sulphamates and carbonates.

In an embodiment, preference is given to the sulphates, sulphamates and carbonates of ammonium or of an alkali metal, alkaline earth metal, transition metal or poor metal. Mention may be made, as examples, of ammonium sulphate, ammonium hydrogensulphate, ammonium sulphamate, ammonium carbonate, ammonium bicarbonate, iron sulphate, cobalt sulphate, nickel sulphate, copper sulphate, zinc sulphate or aluminium sulphate.

In an embodiment, the choice is advantageously made of sulphates, in particular aluminium sulphate, copper sulphate, iron sulphate, potassium aluminium sulphate (or potassium alum) or ammonium sulphate and better still of iron sulphate, copper sulphate or ammonium sulphate.

The amount of agent capable of reducing the VOC emissions generally represents from 2 to 25% of the weight of the saccharide and organic polycarboxylic acid, preferably from 3 to 20% and advantageously from 5 to 15%.

The sizing composition in accordance with an embodiment of the invention can additionally comprise the conventional additives below in the following proportions, calculated on the basis of 100 parts by weight of saccharide and organic polycarboxylic acid:
- from 0 to 2 parts of silane, in particular an aminosilane,
- from 0 to 20 parts of oil, preferably from 4 to 15 parts,
- from 0 to 30 parts of urea and/or glycerol, preferably from 0 to 20 parts,
- from 0 to 5 parts of a silicone,
- from 0 to 30 parts of an "extender" chosen from lignin derivatives, such as ammonium lignosulphonate (ALS) or sodium lignosulphonate, and animal or plant proteins.

The role of the additives is known and briefly restated: the silane is an agent for coupling between the fibres and the binder, and also acts as antiageing agent; the oils are dust-preventing and hydrophobic agents; the urea and the glycerol act as plasticizers and make it possible to prevent pregelling of the sizing composition; the silicone is a hydrophobic agent having the role of reducing absorption of water by the insulating product; the "extender" is an organic filler, soluble or dispersible in the aqueous sizing composition, which makes it possible in particular to reduce the cost of the sizing composition.

The sizing composition exhibits an acidic pH, of the order of from 1 to 4.5 depending on the organic polycarboxylic acid used, preferably of greater than 1.5. In an embodiment, advantageously, the pH is maintained at a value of at least equal to 2, so as to limit the problems of instability of the sizing composition and of corrosion of the manufacturing line; by virtue of the addition of an amino compound which is not capable of reacting with the saccharide, for example a tertiary amine, in particular triethanolamine. The amount of amino compound can represent up to 30 parts by weight of the total weight of saccharide and organic polycarboxylic acid.

The process for the manufacture of the acoustic and/or thermal insulating products also constitutes a subject-matter of the invention.

The sizing composition is intended to be applied to mineral fibres, in particular glass or rock fibres.

The process for the manufacture of the acoustic and/or thermal insulating products using the abovementioned sizing composition also constitutes a subject-matter of the invention.

Conventionally, the sizing composition is projected onto the mineral fibres at the outlet of the centrifugal device and before they are collected on the receiving member in the form of a web of fibres which are subsequently treated at a temperature which makes possible the crosslinking of the size and the formation of an infusible binder. The crosslinking of the size according to an embodiment of the invention takes place at a temperature comparable to that of a conventional formaldehyde-phenol resin, at a temperature of greater than or equal to 110° C., preferably of greater than or equal to 130° C. and advantageously of greater than or equal to 140° C.

The acoustic and/or thermal insulating products obtained from these sized fibres also constitute a subject-matter of the present invention.

These products are generally provided in the form of a mat or felt of mineral wool, of glass or of rock, or of a veil of mineral fibres, also of glass or of rock, intended in particular to form a surface coating on the said mat or the said felt.

The examples which follow make it possible to illustrate the invention without, however, limiting it.

In these examples, the following are measured:

the thickness of the product after manufacture and after a variable period of time under compression with a degree of compression (defined as being the ratio of the nominal thickness to the thickness under compression) equal to 8.0 (Examples 1 to 3) or 4.8 (Examples 8 and 9). The measurement of the thickness makes it possible to evaluate the good dimensional behaviour of the product, the tensile strength according to Standard ASTM C 686-71T on a sample cut out by stamping from the insulating product. The sample has the shape of a torus with a length of 122 mm, a width of 46 mm, a radius of curvature of the cut-out of the outer edge equal to 38 mm and a radius of curvature of the cut-out of the inner edge equal to 12.5 mm.

The sample is positioned between two cylindrical mandrels of a test machine, one of which is movable and is moved at a constant rate. The breaking force F (in newtons) of the sample is measured and the tensile strength TS, defined by the ratio of the breaking force F to the weight of the sample, is calculated.

The tensile strength is measured after manufacture (initial tensile strength) and after accelerated ageing in an autoclave at a temperature of 105° C. under 100% relative humidity for 15 minutes (TS 15), the amount of volatile organic products emitted by the product.

The procedure is as follows: 10 ml of water are introduced into a glass desiccator equipped with a grid at mid-height and a sample (5 cm×6 cm), cut out from the centre of the product to be tested, and a diffusive sampler comprising a cartridge (Radiello® RAD 147, sold by Sigma Aldrich) which traps VOCs are placed on the grid, which is not in contact with the water.

The desiccator is hermetically closed and placed in an oven at 40° C. for 6 hours.

The contents of the cartridge are analyzed by gas chromatography coupled to mass spectrometry (GC/MS) using an RTX5 MS capillary column (sold by Restek), with a diameter equal to 0.25 mm, exhibiting a thickness of the stationary phase of 1 μm and a length of 30 m, and a thermal desorption injector.

The areas under the peaks of the chromatogram are measured and the percentage of VOCs emitted is expressed as a percentage with respect to the reference product not comprising an agent capable of reducing the VOC emissions.

EXAMPLES 1 TO 3

Sizing compositions are prepared which comprise the constituents appearing in Table 1 (as parts by weight).

The sizing compositions are used to form insulating products based on mineral wool.

Glass wool is manufactured continuously on a production line with a width of 1.2 m. The glass wool is formed by the internal centrifugation technique in which the molten glass composition is converted into fibres by means of a tool, referred to as centrifuging disc: the disc is rotated about its vertically positioned axis of symmetry, the composition is ejected through the orifices under the effect of the centrifugal force and the material escaping from the orifices is drawn into fibres with the assistance of a drawing gas stream.

Conventionally, a size spraying ring is positioned beneath the fiberizing disc so as to uniformly distribute the sizing composition over the glass wool which has just been formed. The mineral wool, thus sized, is collected on a belt conveyor equipped with internal extraction boxes which hold the mineral wool in the form of a felt at the surface of the conveyor. The felt is cut up and then placed in an oven maintained at 270° C., where the constituents of the size polymerize to form a binder.

The insulating product obtained exhibits a nominal thickness of 152 mm and a nominal density equal to 10 kg/m$^3$.

The properties of the products appear in Table 1.

At a similar loss on ignition, the product of Example 1 emits less VOCs than that of Comparative Example 3. Example 2, which has a greater loss on ignition, greater than that of Comparative Example 3, exhibits a lower level of emission of VOCs.

EXAMPLES 4 TO 7

Sizing compositions are prepared which comprise the constituents appearing in Table 2 (as parts by weight).

The sizing compositions are used to form insulating products based on glass wool, according to the technique described in Examples 1 to 3, on a production line with a width of 2.4 m.

The insulating product obtained at the outlet of the oven exhibits a nominal thickness of the order of 254 mm and a nominal density equal to 7.5 kg/m$^3$.

The properties of the products appear in Table 2.

Examples 4 to 6 according to the invention exhibit a lower level of emission than Comparative Example 7, at an equivalent loss on ignition.

EXAMPLES 8 AND 9

The procedure is carried out under the conditions of Examples 4 to 7, modified in that the sizing compositions have the composition given in Table 3 and the insulating product has a nominal thickness equal to 82 mm and a nominal density equal to 17.5 kg/m$^3$.

The properties of the products appear in Table 3.

It is found that Example 8 exhibits a reduced level of emission with respect to Comparative Example 3, despite a higher loss on ignition.

TABLE 1

|  | Ex. 1 | Ex. 2 | Ex. 3 (Comparative) |
| --- | --- | --- | --- |
| Sizing composition |  |  |  |
| Saccharide[(1)] | 62.0 | 62.0 | 62.0 |
| Citric acid | 38.0 | 38.0 | 38.0 |
| Sodium hypophosphite | 5.0 | 5.0 | 5.0 |
| Copper sulphate | 5.0 | — | — |
| Aluminium sulphate | — | 5.0 | — |
| γ-Aminopropyltriethoxysilane | 0.44 | 0.44 | 0.44 |
| Mineral oil | 12.0 | 12.0 | 12.0 |
| Silicone | 0.8 | 0.8 | 0.8 |
| pH |  |  |  |
| at 10% of solid matter | 1.9 | 1.8 | 2.0 |
| at 3% of solid matter | 2.2 | 2.0 | 2.4 |
| Properties of the product |  |  |  |
| Loss on ignition (%) | 4.6 | 5.3 | 4.8 |

TABLE 1-continued

|  | Ex. 1 | Ex. 2 | Ex. 3 (Comparative) |
|---|---|---|---|
| Thickness (mm) | | | |
| after 24 hours | 161 | n.d. | 175 |
| after 7 days | 166 | n.d. | 161 |
| after 30 days | 169 | 169 | 160 |
| VOC emissions (%) | 79.3 | 85.7 | 100 | n.d.: not determined
[1]dextrin exhibiting a dextrose equivalent DE equal to 26.5

TABLE 2

|  | Ex. 4 | Ex. 5 | Ex. 6 | Ex. 7 (Comparative) |
|---|---|---|---|---|
| Sizing composition | | | | |
| Saccharide[1] | 62.0 | 62.0 | 62.0 | 62.0 |
| Citric acid | 38.0 | 38.0 | 38.0 | 38.0 |
| Sodium hypophosphite | 5.0 | 5.0 | 5.0 | 5.0 |
| Iron sulphate | 5.0 | — | — | — |
| Ammonium sulphate | — | 5.0 | 10 | — |
| γ-Aminopropyltriethoxysilane | 0.46 | 0.46 | 0.46 | 0.46 |
| Mineral oil | 12.6 | 12.6 | 12.6 | 12.6 |
| Silicone | 0.5 | 0.5 | 0.5 | 0.5 |
| pH | | | | |
| at 10% of solid material | 1.9 | 2.2 | 2.2 | 2.0 |
| at 3% of solid material | 2.2 | 2.4 | 2.4 | 2.4 |
| Properties of the product | | | | |
| Loss on ignition (%) | 5.5 | 5.4 | 5.3 | 5.2 |
| VOC emissions (%) | 81.3 | 91.6 | 62.4 | 100 |

[1]dextrin exhibiting a dextrose equivalent DE equal to 26.5

TABLE 3

|  | Ex. 8 | Ex. 9 (Comparative) |
|---|---|---|
| Sizing composition | | |
| Saccharide[1] | 62.0 | 62.0 |
| Citric acid | 38.0 | 38.0 |
| Sodium hypophosphite | 5.0 | 5.0 |
| Iron sulphate | 5.0 | — |
| γ-Aminopropyltriethoxysilane | 0.5 | 0.5 |
| Mineral oil | 8.0 | 8.0 |
| Silicone | 1.5 | 1.5 |
| pH | | |
| at 10% of solid material | 1.9 | 2.0 |
| at 3% of solid material | 2.2 | 2.4 |
| Properties of the product | | |
| Loss on ignition (%) | 6.7 | 5.9 |
| Thickness (mm) | | |
| after 1 hour | 76.5 | 77.3 |
| after 1 day | 70.0 | 75.5 |
| after 14 days | 73.0 | 72.4 |
| after 30 days | 70.6 | 70.7 |
| after 90 days | 70.5 | 70.8 |
| Tensile strength (N/g) | | |
| initial | 3.84 | 3.82 |
| after ageing | 3.36 | 3.54 |
| loss | 12.5% | 7.3% |
| VOC emissions (%) | 66.9 | 100 | n.d.: not determined
[1]dextrin exhibiting a dextrose equivalent DE equal to 30

What is claimed is:

1. A sizing composition for insulating products based on glass or rock wool, the sizing composition comprising:
   at least one saccharide;
   at least one organic polycarboxylic acid;
   at least one esterification catalyst selected from the group consisting of sodium phosphite, potassium phosphite, sodium hypophosphite, potassium hypophosphite and mixtures thereof, and
   at least one agent capable of reducing the emissions of volatile organic compounds (VOCs) selected from the group consisting of iron sulphate, copper sulphate, ammonium sulphate, a sulphamate, ammonium carbonate, ammonium bicarbonate and mixtures thereof.

2. The sizing composition according to claim 1, wherein the saccharide is chosen from monosaccharides including from 3 to 8 carbon atoms.

3. The sizing composition according to claim 2, wherein the saccharide is chosen from aldoses.

4. The sizing composition according to claim 3, wherein the aldoses comprise from 5 to 7 carbon atoms.

5. The sizing composition according to claim 1, wherein the saccharide is a disaccharide, a trisaccharide, a tetrasaccharide, a pentasaccharide, a dextrin or its hydrogenation product, a molasses or a starch.

6. The sizing composition according to claim 1, wherein the saccharide is glucose, a dextrin or a molasses.

7. The sizing composition according to claim 1, wherein the organic polycarboxylic acid comprises at most 50 carboxyl functional groups.

8. The sizing composition according to claim 7, wherein the organic polycarboxylic acid comprises at most 30 carboxyl functional groups.

9. The sizing composition according to claim 8, wherein the organic polycarboxylic acid comprise at most 20 carboxyl functional groups.

10. The sizing composition according to claim 1, wherein the organic polycarboxylic acid is citric acid, 1,2,3,4-butanetetracarboxylic acid, succinic acid, tartaric acid, glutamic acid, itaconic acid, maleic acid, citraconic acid, maleic anhydride, succinic anhydride or a (meth)acrylic acid polymer.

11. The sizing composition according to claim 10, wherein the organic polycarboxylic acid is citric acid, 1,2,3,4-butanetetracarboxylic acid or a (meth)acrylic acid polymer.

12. The sizing composition according to claim 1, wherein the saccharide represents from 5 to 90% of the weight of the mixture composed of the saccharide and the organic polycarboxylic acid.

13. The sizing composition according to claim 12, wherein the saccharide represents from 20 to 85% of the weight of the mixture composed of the saccharide and the organic polycarboxylic acid.

14. The sizing composition according to claim 13, wherein the saccharide represents from 30 to 80% of the weight of the mixture composed of the saccharide and the organic polycarboxylic acid.

15. The sizing composition according to claim 1, wherein the esterification catalyst is sodium phosphite, sodium hypophosphite or the mixtures of these compounds.

16. The sizing composition according to claim 1, wherein the esterification catalyst represents from 1 to 20% of the weight of the saccharide and the organic polycarboxylic acid.

17. The sizing composition according to claim 16, wherein the esterification catalyst represents from 2 to 15% of the weight of the saccharide and the organic polycarboxylic acid.

18. The sizing composition according to claim 16, wherein the esterification catalyst represents from 2.5 to 10% of the weight of the saccharide and the organic polycarboxylic acid.

19. The sizing composition according to claim 1, wherein the sulfamate is a sulphamate of ammonium or of an alkali metal, alkaline earth metal, transition metal or poor metal.

20. The sizing composition according to claim 1, wherein the amount of agent capable of reducing the VOC emissions represents from 2 to 25% of the weight of the saccharide and organic polycarboxylic acid.

21. The sizing composition according to claim 20, wherein the amount of agent capable of reducing the VOC emissions represents from 3 to 20% of the weight of the saccharide and organic polycarboxylic acid.

22. The sizing composition according to claim 21, wherein the amount of agent capable of reducing the VOC emissions represents from 5 to 15% of the weight of the saccharide and organic polycarboxylic acid.

23. The sizing composition according to claim 1, comprising the following additives below in the following proportions, calculated on the basis of 100 parts by weight of saccharide and organic polycarboxylic acid:
from 0 to 2 parts of silane,
from 0 to 20 parts of oil,
from 0 to 30 parts of urea and/or glycerol,
from 0 to 5 parts of a silicone,
from 0 to 30 parts of an extender chosen from ammonium lignosulphonate or sodium lignosulphonate and animal or plant proteins.

24. An acoustic and/or thermal insulating product based on glass or rock wool, sized using the sizing composition according to claim 1.

25. A process for the manufacture of an acoustic and/or thermal insulating product based on a mineral wool, the method comprising:
projecting a sizing composition onto said wool or on fibres, and
treating said wool or said fibres at a temperature permitting crosslinking of the size and formation of an infusible binder, wherein the sizing composition comprises
at least one saccharide,
at least one organic polycarboxylic acid,
at least one esterification catalyst selected from the group consisting of sodium phosphite, potassium phosphite, sodium hypophosphite, potassium hypophosphite, and mixtures thereof, and
at least one agent capable of reducing the emissions of volatile organic compounds (VOCs) from the group consisting of iron sulphate, copper sulphate, ammonium sulphate, a sulphamate, ammonium carbonate, ammonium bicarbonate and mixtures thereof.

* * * * *